(12) United States Patent
Chen

(10) Patent No.: US 6,407,790 B1
(45) Date of Patent: Jun. 18, 2002

(54) METHOD OF FABRICATING A LIQUID CRYSTAL DISPLAY

(75) Inventor: Hsin-Ming Chen, Tainan Hsien (TW)

(73) Assignee: AU Optronics Corporation, Hsin-Chu (TW)

( * ) Notice: Subject to any disclaimer, the term of this patent is extended or adjusted under 35 U.S.C. 154(b) by 40 days.

(21) Appl. No.: 09/734,614

(22) Filed: Dec. 13, 2000

(30) Foreign Application Priority Data

Sep. 13, 2000 (TW) ........................................ 89118763 A

(51) Int. Cl.$^7$ ............................................. G02F 1/1335

(52) U.S. Cl. ...................... 349/124; 349/113; 349/122

(58) Field of Search ................................ 349/113, 122, 349/124

(56) References Cited

U.S. PATENT DOCUMENTS 4,519,678 A * 5/1985 Komatsubara et al. ...... 349/113
6,335,150 B1 * 1/2002 Tsai ............................ 349/124

* cited by examiner

*Primary Examiner*—James Dudek
(74) *Attorney, Agent, or Firm*—Darby & Darby

(57) ABSTRACT

A method of fabricating a liquid crystal display (LCD) is performed on a glass substrate. First, an organic layer is formed on the glass substrate and then a pattern layer is formed on the organic layer. Next, by employing an attenuated mask, the pattern layer is formed as a plurality of first protrusions that are unconnected with each other and each of the first protrusions has a ladder profile. Next, a dry etching process is performed to remove all of the first protrusions and part of the organic layer so as to form the remaining organic layer as a plurality of second protrusions corresponding to the first protrusions. The second protrusion has two sloped and intersected sidewalls.

23 Claims, 5 Drawing Sheets

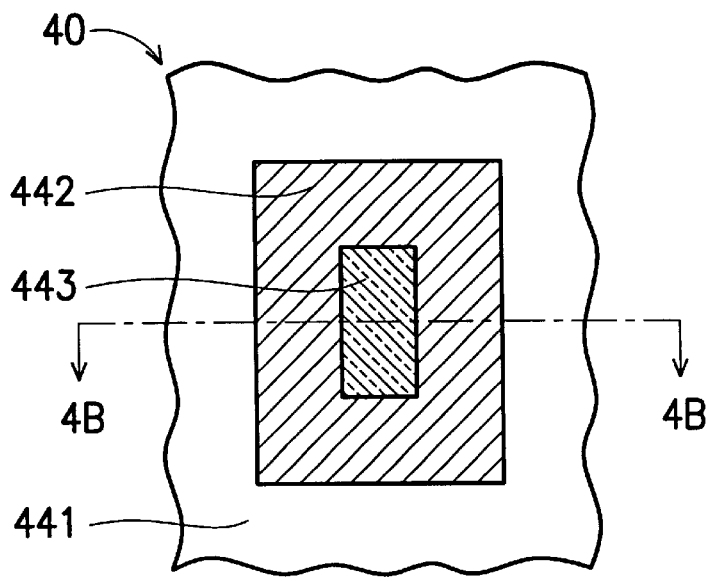
FIG. 4A
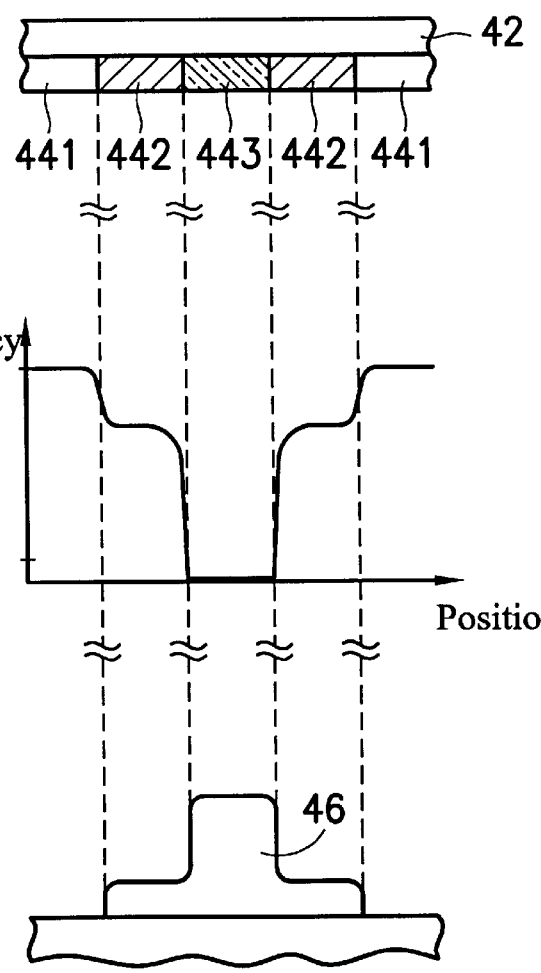
FIG. 4B
FIG. 4C
FIG. 4D

METHOD OF FABRICATING A LIQUID CRYSTAL DISPLAY

BACKGROUND OF THE INVENTION

1. Field of the Invention

The present invention relates in general to a method of fabricating a liquid crystal display (LCD). In particular, the present invention relates to a method of fabricating an alignment-control structure and a reflective layer of an LCD.

2. Description of the Related Art

Applied voltage and heat on a liquid crystal display (LCD) changes the alignment of liquid crystals from an initial specific status to another status, and then the accompanied optical characteristics, such as double refraction, optical rotation, dichromatism, optical confusion and optical scattering will be transformed into visional variation. Compared with the electric-optical materials used in other optical devices, the liquid crystals can distribute substantial variation in optical characteristics with low voltage and low electric power consumption and without further working and shaping treatment. Also, LCD has advantages of thin shape and light weight. Therefore, LCD plays an important role on the flat display market.

The display mode of LCD is different from the type of the liquid crystals thereof. One mode named electrically controlled birefringence (ECB) employs applied electric field to control the multi-refraction characteristics of the liquid crystal, wherein nematic crystal having a negative anisotropy of its dielectric constant is utilized together with a vertical alignment layer. When the applied voltage exceeds the critical voltage, the liquid crystal molecules that are originally aligned perpendicular to the vertical alignment layer will rotate at an angle corresponding to the applied electric field. Besides, for further controlling the alignment of the liquid crystal molecules, an alignment-control structure is fabricated on the LCD substrate to increase the amount of alignment domain in a pixel area. This is possible to secure a wide visual field angle and a high contrast.

Please refer to FIG. 1. FIG. 1 is a cross-sectional schematic diagram of an LCD cell 10 according to the prior art. The LCD cell 10 comprises an upper glass substrate 12, a lower glass substrate 14, and a liquid crystal 16 with a negative anisotropy of its dielectric constant filling the space between the two glass substrates 12, 14. Two electrodes 18, 22 and two vertical alignment layers 20, 24 are respectively formed on the inner surface of the glass substrates 12, 14, and two polarizers 26, 28 are respectively formed on the outer surface of the glass substrates 12, 14. In general, the upper glass substrate 12 serves as a color filter substrate. The lower glass substrate 14 serves as a thin film transistor (TFT) substrate where a plurality of TFTs and active matrix drive circuits are formed and the electrode 22 on the lower glass substrate 14 serves as a pixel electrode. Furthermore, the LCD cell 10 comprises a plurality of first protrusions 30 and second protrusions 32 respectively formed on the electrodes 18, 22 to serve as the alignment-control structure.

Please refer to FIG. 2. FIG. 2 shows the variation in alignment of the liquid crystal molecules. In the case where the liquid crystal 16 having a negative anisotropy of dielectric constant is arranged between the vertical alignment layers 20, 24, all the liquid crystal molecules are aligned in the direction perpendicular to the vertical alignment layers 20, 24 when no voltage is applied thereto. The liquid crystal molecules 16A are aligned in the direction perpendicular to the glass substrates 12, 14. The liquid crystal molecules 16B, 16C positioned on the slopes of the protrusions 30, 32 are aligned at an angle to the vertical alignment layers 20, 24. Upon application of the voltage to the LCD cell 10, the crystal liquid 16 rotates toward the electric field wherein the alignment variation is shown by the arrows. As a result, part of the liquid crystal molecules rotate in the clockwise direction and another part of liquid crystal molecules rotate in the counterclockwise direction to accordingly increase the amount of alignment domain in a pixel area.

Please refer to FIG. 3A to FIG. 3C. FIG. 3A to FIG. 3C are schematic diagrams of a method of forming the alignment-control structure according to the prior art. First, a polymer resin layer 38 possessing photosensitive and thermosetting characteristics is coated on an electrode 36 of a glass substrate 34, and then a curing treatment is performed on the polymer resin layer 38. Next, by using a photoresist layer with strip-shaped openings (not shown), the exposure process and the photolithography process are performed to form the polymer resin layer 38 as a plurality of strip-shaped protrusions 39. Finally, a heat treatment is applied to make the polymer resin layer 38 reflow, and thereby the sharp-pointed edge of the protrusion 39 is rounded to complete the preferred alignment-control structure.

However, the planar area on the top of the protrusion 39 with a round profile is too large. The liquid crystal molecules positioned thereon (such as the liquid crystal molecules 16C shown in FIG. 2) is affected by a weaker electric field, and therefore sways toward the left and right since the aligned direction is not determined. This may result in spots or dark lines on the display screen and affect the display quality. In order to solve the problem, the alignment-control structure is designed as an approximate triangle profile to decrease the planar area on the top of the protrusion as much as possible. Unfortunately, this preferred protrusion is made of stacked layers by repeating deposition, photolithography and etching processes those complicated processes increase not only process cost but also difficulty in process property.

SUMMARY OF THE INVENTION

An object of the present invention is to provide a method of fabricating an alignment-control structure having a triangle profile to solve the above-mentioned problems.

The present invention provides a method of fabricating a liquid crystal display (LCD). First, an organic layer is formed on a glass substrate and then a pattern layer is formed on the organic layer. Next, by employing an attenuated mask, the pattern layer is formed as a plurality of first protrusions that are unconnected with each other and each of the first protrusions has a ladder profile. Next, a dry etching process is performed to remove all of the first protrusions and part of the organic layer so as to form the remaining organic layer as a plurality of second protrusions corresponding to the first protrusions. The second protrusion has two sloped and intersected sidewalls.

This and other objectives of the present invention will no doubt become obvious to those of ordinary skill in the art after having read the following detailed description of the preferred embodiment which is illustrated in the various figures and drawings.

BRIEF DESCRIPTION OF THE DRAWINGS

The present invention can be more fully understood by reading the subsequent detailed description in conjunction with the examples and references made to the accompanying drawings, wherein:

FIG. 4A is a top view of an attenuated mask according to the present invention.

FIG. 4B is a cross-sectional schematic diagram of the attenuated mask shown in FIG. 4A along line 4B—4B.

FIG. 4C illustrates the transparency of each area on the attenuated mask shown in FIG. 4B.

FIG. 4D is a cross-sectional schematic diagram of a pattern by using the attenuated mask shown in FIG. 4B FIG. 5A to FIG. 5C are cross-sectional schematic diagrams of a method of fabricating a strip-shaped protrusion with a triangle profile according to the present invention.

DETAILED DESCRIPTION OF THE PREFERRED EMBODIMENT

Figure 1:
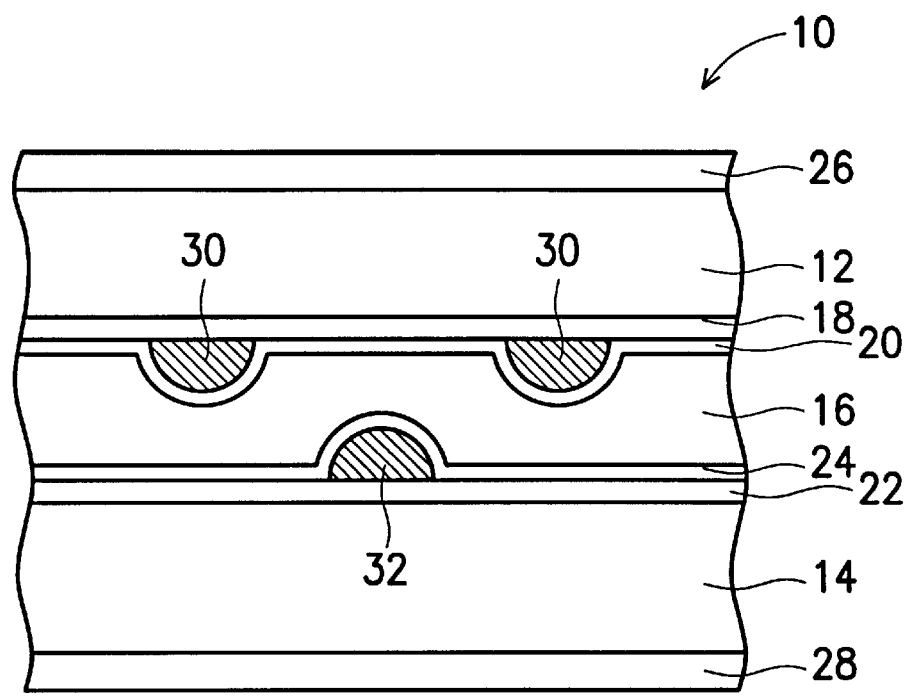
FIG. 1 is a cross-sectional schematic diagram of an LCD cell according to the prior art.
Figure 2:
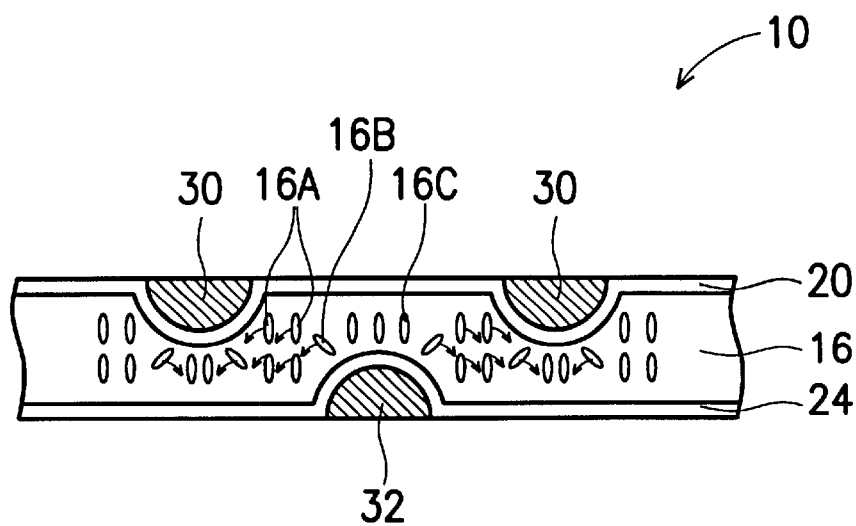
FIG. 2 shows the variation in alignment of the liquid crystal molecules.
Figure 3A:
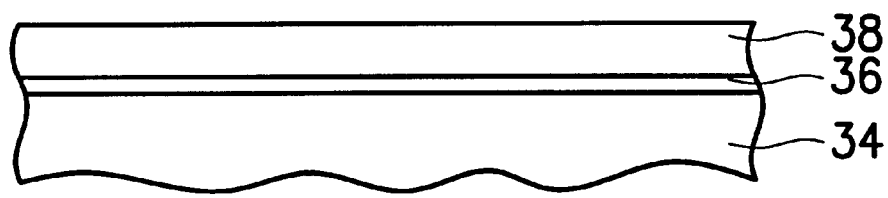
FIG. 3A to FIG. 3C are schematic diagrams of a method of forming the alignment-control structure according to the prior art.
Figure 3B:
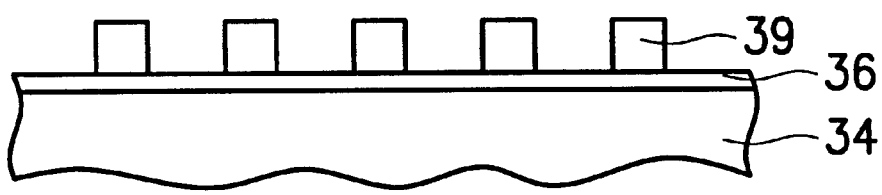
Figure 3C:
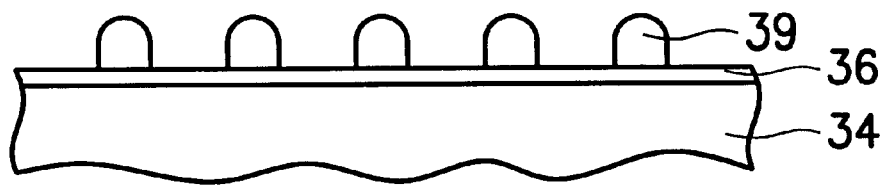

The present invention provides a method of fabricating an alignment-control structure, and more particularly, an attenuated mask is employed to define the sidewall of a top layer as a ladder profile. Next, a selective etching process is performed to remove all the top layer and part of an underlying layer, wherein the underlying layer positioned below the thin area of the top layer is etched, and prior to that, positioned below the thick area, and finally the profile of the remaining underlying layer approximately becomes triangular. Consequently, except for the parameters of reactive gas, etching time and deposition depth, how to precisely control the profile of the underlying layer also greatly depends on controlling the ladder profile of the top layer (such as ladder number and ladder height). In the case of accurately determining the ladder profile, it depends on the pattern of the attenuated mask.

Please refer to FIGS. 4A to 4D. FIG. 4A is a top view of an attenuated mask according to the present invention. FIG. 4B is a cross-sectional schematic diagram of the attenuated mask shown in FIG. 4A along line 4B—4B. FIG. 4C illustrates the transparency of each area on the attenuated mask shown in FIG. 4B. FIG. 4D is a cross-sectional schematic diagram of a pattern by using the attenuated mask shown in FIG. 4B. An attenuated mask 40 comprises a quartz plate 42 and a cap layer that is defined as a first area 441, a second area 442 surrounding the first area 441 and a third area 443 surrounding the second area 442. The first area 441, made of transparent materials, has 100% transparency. The second area 442 preferred made of MoSi has 85~95% transparency to serve as a phase-shifting layer. The third area 443 preferred made of chromium (Cr) has approximately 0% transparency to serve as an opaque layer. When the attenuated mask 40 is utilized to perform the photolithography process on a positive-type photoresist 46, the areas 441~443 having different transparencies make corresponding areas on the photoresist 46 respectively receive different light intensity to achieve an incomplete exposure result. Therefore, each etched depth of the corresponding areas on the photoresist 46 is different and the sidewall of the photoresist 46 can be finally formed as a ladder profile. Also, the attenuated mask 40 can be fabricated with more than three areas having different transparencies from each other to shape the sidewall into many more ladders. Furthermore, if the relationship between the areas 441~443 are appropriately replaced, the attenuated mask 40 can be applied in shaping a negative-type photoresist to form the ladder profile.

In accordance with the above-mentioned method, the ladder profile of the top layer can be accurately determined. As to the method of fabricating the underlying layer with a triangle profile in the present invention, it can be more fully understood by reading the subsequent detailed description.

First Embodiment

Figure 5A:
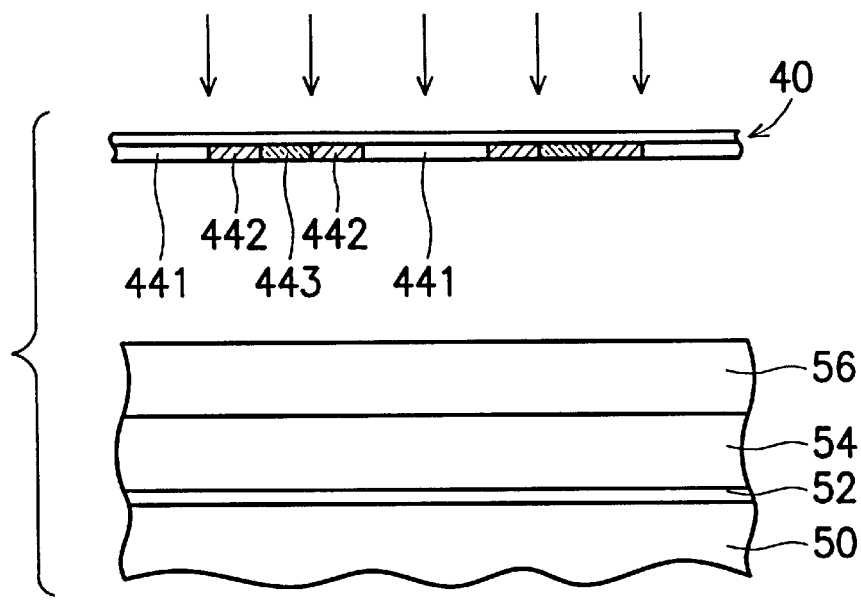
Figure 5B:
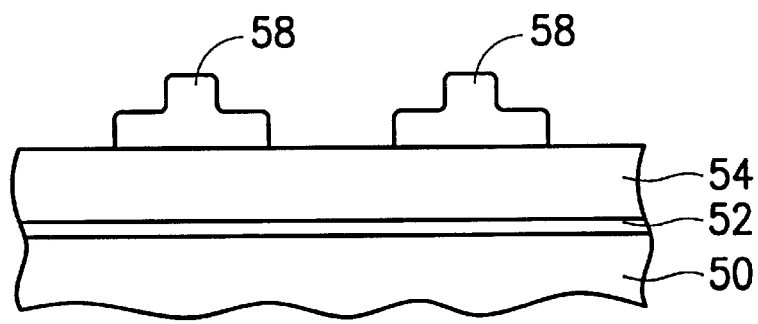
Figure 5C:
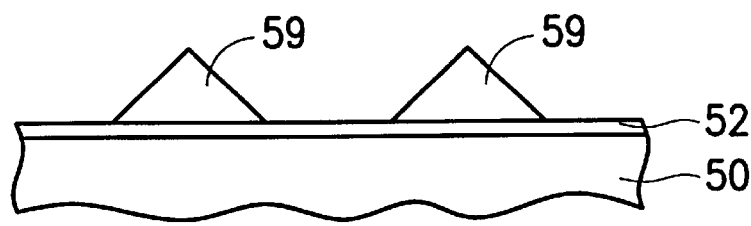

Please refer to FIGS. 5A to 5C. FIGS. 5A to FIG. 5C are cross-sectional schematic diagrams of a method of fabricating a strip-shaped protrusion with a triangle profile according to the present invention. As shown in FIG. 5A, an organic layer 54 is first coated on an electrode 52 of a glass substrate 50 followed by a curing treatment, and then a photoresist layer 56 is formed on the cured organic layer 54. Next, by using the attenuated mask 40 shown in FIG. 4, the photoresist layer 56 is defined and formed as a plurality of first protrusions 58 those are discontinuous to each other. In accordance with the design of the areas 441~443 of the attenuated mask 40, such as transverse width, position and transparency, the profile of the first protrusion 58 is shaped as a ladder, as shown in FIG. 5B.

Next, a dry etching process, such as reactive ion etching (RIE) is performed to remove all the first protrusions 58 and part of the organic layer 54. Because the first protrusion 58 has two areas of different thickness, the thinner area of the first protrusion 58 is earlier etched away to keep on downwardly etching the organic layer 54 till the thicker area of the first protrusion 58 is completely removed. As a result, the remaining organic layer 54 becomes a plurality of second protrusions 59 having triangle profiles and corresponding to the first protrusions 58. The two sidewalls of the second protrusion 59 are intersected inclines, and the planar area on the top of the second protrusion 59 is quite small and almost becomes a line. Consequently, utilizing the second protrusion 59 as the alignment-control structure has many advantages, such as avoiding spots or dark lines produced on the screen and increasing the displaying properties of the LCD.

Second Embodiment

In the second embodiment of the present invention, the method of forming the strip-shaped protrusions having a triangular profile is almost the same as the method described in the first embodiment except for replacing the photoresist layer 56 with photosensitive organic materials. In this case, a photosensitive organic layer (not shown) having a thickness equal to the sum of the depth of the organic layer 54 and the photoresist layer 56 is coated on the substrate 50. After performing the curing treatment on the photosensitive organic layer, the photolithography and etching processes described in the first embodiment can form the photosensitive organic layer as the second protrusions 59 having a triangular profile.

Third Embodiment

The present invention not only applies to the formation of the alignment-control structure, but also to the formation of a reflective layer of a reflective-type LCD. Please refer to FIGS. 6A to 6E. FIGS. 6A to 6E are cross-sectional schematic diagrams of a reflective layer having a concave/convex profile according to the present invention. As shown in FIG. 6B, a semiconductor substrate 60 comprises many semiconductor devices (not shown), such as TFTs, resistors or capacitors for driving a reflection-type LCD. An organic layer 62 is first coated on the semiconductor substrate 60 followed by a curing treatment, and then a photoresist layer 64 on the organic layer 62.

Figure 6A:
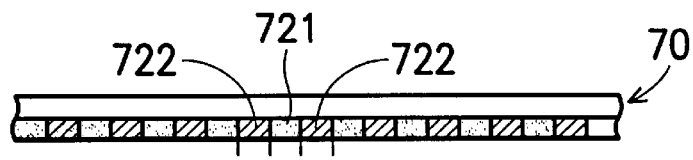
FIG. 6A to FIG. 6E are cross-sectional schematic diagrams of a reflective layer having a concave/convex profile according to the present invention.
Figure 6B:
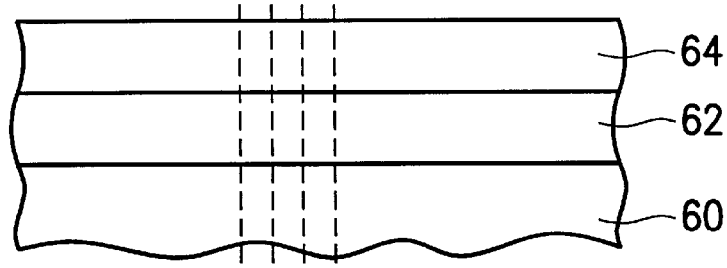
Figure 6C:
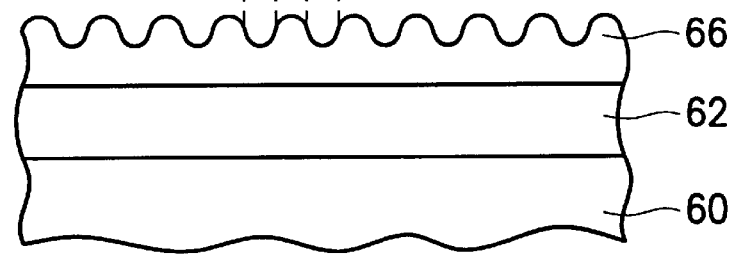

Next, by using an attenuated mask 70 (as shown in FIG. 6A), the photoresist layer 64 is formed as a plurality of first protrusions 66 those are connected and constitute a concave/convex profile, as shown in FIG. 6C. In order to define the concave/convex profile, the attenuated mask 70 comprises a plurality of first areas 721 having 0~10% transparency and a plurality of second areas 722 having 70~80% transparency. Also, the traverse width of the first area 721 and the second area 722 is smaller than that of the areas 441~443 of the attenuated mask 40.

Figure 6D:
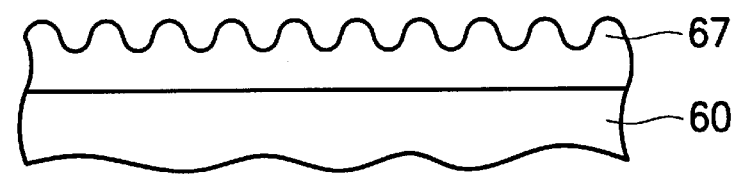
Figure 6E:
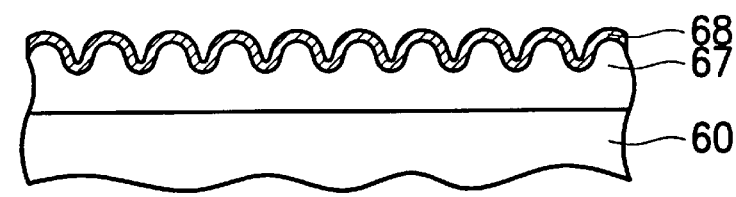

Next, a dry etching process is performed to remove all of the first protrusions 66 and part of the organic layer 62. Because the first protrusions 66 have concave areas and convex areas, the thinner area is earlier etched away to keep on downwardly etching the organic layer 62 until the thicker area of the first protrusions 66 is completely removed. As a result, the remaining organic layer 62 becomes a plurality of second protrusions 67 constituting a concave/convex profile and corresponding to the first protrusions 66, as shown in FIG. 6D. Finally, a reflective layer 68 made of aluminum coated on the second protrusions 67 accordingly presents a concave/convex profile, as shown in FIG. 6E.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method of fabricating a liquid crystal display (LCD), including:
    (a) providing a glass substrate;
    (b) forming an organic layer on the glass substrate and then forming a pattern layer on the organic layer;
    (c) employing an attenuated mask to form the pattern layer as a plurality of first protrusions that are unconnected with each other, wherein each of the first protrusions has a ladder profile; and
    (d) performing a dry etching process to remove all of the first protrusions and part of the organic layer so as to form the remaining organic layer as a plurality of second protrusions corresponding to the first protrusions.

2. The method as claimed in claim 1, wherein the surface of the glass substrate comprises an electrode.

3. The method as claimed in claim 1, wherein the pattern layer is a photoresist layer.

4. The method as claimed in claim 1, wherein the pattern layer is a photosensitive organic layer.

5. The method as claimed in claim 1, wherein the attenuated mask comprises at least three areas of different transparencies.

6. The method as claimed in claim 1, wherein the dry etching process is a reactive ion etch (RIE) process.

7. The method as claimed in claim 1, wherein the second protrusion has a triangle profile.

8. The method as claimed in claim 1, wherein the second protrusion serves as an alignment-control structure for increasing the amount of domain of the LCD.

9. The method as claimed in claim 1, wherein the second protrusion has two sloped and intersected sidewalls.

10. A method of fabricating a liquid crystal display (LCD), including:
    (a) providing a glass substrate;
    (b) forming a pattern layer on the glass substrate;
    (c) employing an attenuated mask to form the pattern layer as a plurality of first protrusions that are unconnected with each other, wherein each of the first protrusions has a ladder profile; and
    (d) performing a dry etching process to remove all of the first protrusions and formed the remaining pattern layer as plurality of second protrusions.

11. The method as claimed in claim 10, wherein the surface of the glass substrate comprises an electrode.

12. The method as claimed in claim 10, wherein the pattern layer is a photosensitive organic layer.

13. The method as claimed in claim 10, wherein attenuated mask comprises at least three areas of different transparencies.

14. The method as claimed in claim 10, wherein the dry etching process is a reactive ion etch (RIE) process.

15. The method as claimed in claim 10, wherein the second protrusion has a triangle profile.

16. The method as claimed in claim 10, wherein the second protrusion serves as an alignment-control structure for increasing the amount of domain of the LCD.

17. The method as claimed in claim 10, wherein the second protrusion has two sloped and intersected sidewalls.

18. A method of fabricating a liquid crystal display, including:
    (a) providing a semiconductor substrate;
    (b) forming an organic layer on the semiconductor substrate and then forming a pattern layer on the organic layer;
    (c) employing an attenuated mask to form the top surface of the pattern layer as a concave/convex profile;
    (d) performing a dry etching to remove all of the pattern layer and part of the organic layer so as to form the top surface of the remaining organic layer as a concave/convex profile; and
    (e) coating a metal reflective layer on the remaining organic layer to present a concave/convex profile.

19. The method as claimed in claim 18, wherein the pattern layer is a photoresist layer.

20. The method as claimed in claim 18, wherein the pattern layer is a photosensitive organic layer.

21. The method as claimed in claim 18, wherein the attenuated mask comprises at least three areas of different transparencies.

22. The method as claimed in claim 18, wherein the metal reflective layer serves as a reflective electrode of a reflection-type LCD.

23. The method as claimed in claim 18, wherein the concave/convex profile is a gently curve.

* * * * *